US012756918B2

(12) United States Patent
Nakatogawa

(10) Patent No.: US 12,756,918 B2
(45) Date of Patent: Oct. 6, 2026

(54) CAMERA MODULE WITH LIQUID CRYSTAL PANEL FOR CALCULATING DISTANCE

(71) Applicant: Magnolia White Corporation, Tokyo (JP)

(72) Inventor: Hirondo Nakatogawa, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/922,515

(22) Filed: Oct. 22, 2024

(65) Prior Publication Data

US 2025/0047963 A1 Feb. 6, 2025

Related U.S. Application Data

(63) Continuation of application No. PCT/JP2023/011083, filed on Mar. 22, 2023.

(30) Foreign Application Priority Data

May 18, 2022 (JP) ................................ 2022-081529

(51) Int. Cl.
*H04N 23/55* (2023.01)
*G02F 1/133* (2006.01)
(Continued)

(52) U.S. Cl.
CPC ......... *H04N 23/55* (2023.01); *G02F 1/13318* (2013.01); *G02F 1/133526* (2013.01); *H04N 23/667* (2023.01)

(58) Field of Classification Search
CPC ...... H04N 23/55; H04N 23/667; H04N 23/00; H04N 23/60; G02F 1/13318;
(Continued)

(56) References Cited

U.S. PATENT DOCUMENTS 4,543,476 A 9/1985 Horikawa
2018/0166489 A1 6/2018 Sao et al.
(Continued)

FOREIGN PATENT DOCUMENTS

JP 2006-285110 A 10/2006

OTHER PUBLICATIONS

International Search Report mailed on May 23, 2023 for the corresponding PCT Application No. PCT/JP2023/011083, with English machine translation.
(Continued)

*Primary Examiner* — Gevell V Selby
(74) *Attorney, Agent, or Firm* — Michael Best & Friedrich LLP

(57) ABSTRACT

According to one embodiment, a camera module includes an imaging device, a liquid crystal panel and a lens. The liquid crystal panel includes first to fourth areas, a liquid crystal layer, and a driver. A size of the third and fourth areas is smaller than a size of the first and second areas. A first distance to a subject is calculated based on first and second images. The first image is based on light transmitted through the first area. The second image is based on light transmitted through the second area. A second distance to the subject is calculated based on third and fourth images. The third image is based on light transmitted through the third area. The fourth image is based on light transmitted through the fourth area.

4 Claims, 9 Drawing Sheets

(51) Int. Cl.
*G02F 1/1335* (2006.01)
*H04N 23/667* (2023.01)

(58) Field of Classification Search
CPC ....... G02F 1/133526; G02F 1/13; G01C 3/06; G02B 7/36; G03B 9/02; G03B 15/00
See application file for complete search history.

(56) References Cited

U.S. PATENT DOCUMENTS

| | | | | |
|---|---|---|---|---|
| 2021/0019899 | A1* | 1/2021 | Ono | H04N 25/704 |
| 2021/0318569 | A1* | 10/2021 | Clemen, Jr. | H04N 23/55 |
| 2022/0368785 | A1* | 11/2022 | Aoki | H04N 23/55 |
| 2023/0236454 | A1* | 7/2023 | Igeta | H04N 23/95<br>349/158 |

OTHER PUBLICATIONS

Japanese Office Action mailed on Apr. 21, 2026 for the corresponding Japanese Patent Application No. 2024-521576, with English machine translation.

* cited by examiner

CAMERA MODULE WITH LIQUID CRYSTAL PANEL FOR CALCULATING DISTANCE

CROSS-REFERENCE TO RELATED APPLICATIONS

This application is a Continuation Application of PCT Application No. PCT/JP2023/011083, filed Mar. 22, 2023 and based upon and claiming the benefit of priority from Japanese Patent Application No. 2022-081529, filed May 18, 2022, the entire contents of all of which are incorporated herein by reference.

FIELD

Embodiments described herein relate generally to a camera module.

BACKGROUND

In recent years, electronic devices such as smartphones including a liquid crystal panel and a camera (imaging device) provided on the back of the liquid crystal panel have been put into practical use.

By the way, a coded aperture technique of calculating the distance from the camera to a subject in the image using the blur that occurs in the image generated based on the light passing through the aperture of the camera of the electronic device and made incident on the imaging device is known.

With the coded aperture technology, however, it may not be possible to calculate an appropriate distance from an image, and there is a need to improve the accuracy of the calculated distance.

BRIEF DESCRIPTION OF THE DRAWINGS

FIG. 3 is a plan view showing the arrangement of a liquid crystal panel, a camera, and the like.

DETAILED DESCRIPTION

Figure 1:
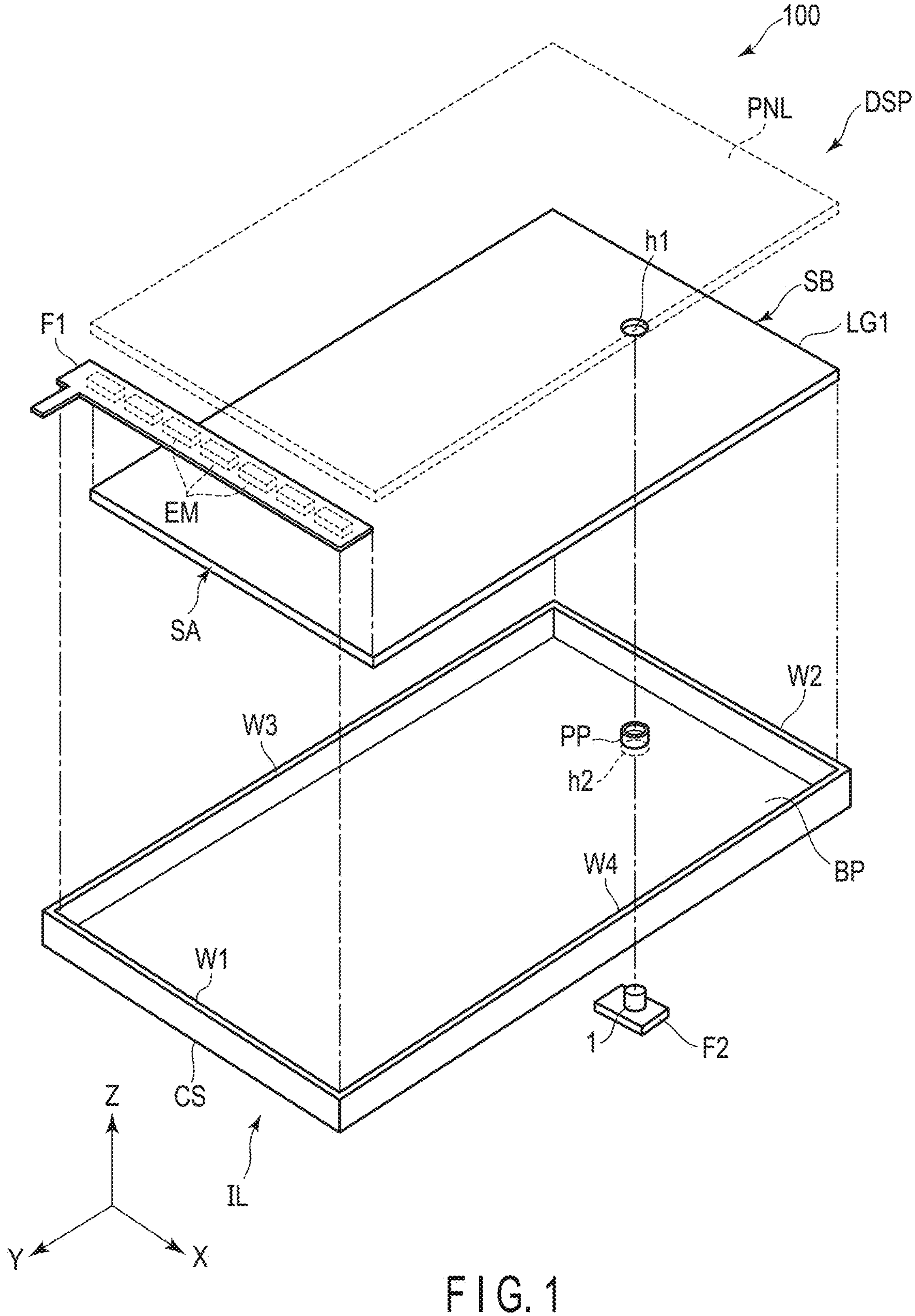
FIG. 1 is an exploded perspective view showing a configuration example of an electronic device according to an embodiment.

In general, according to one embodiment, a camera module includes: an imaging device; a liquid crystal panel including an incident light control area including first to fourth light transmissive areas provided at positions where light is made incident on the imaging device, a liquid crystal layer provided at a position overlapping with the incident light control area, and a driver driving the liquid crystal layer to transmit light through each of the first to fourth light transmissive areas; and a lens located between the imaging device and the liquid crystal panel. A size of the third and fourth light transmissive areas is smaller than a size of the first and second light transmissive areas. A first distance to a subject in first and second images is calculated based on the first and second images. The first image is based on the light transmitted through the first light transmissive area and the lens and made incident on the imaging device by driving the liquid crystal layer. The second image is based on the light transmitted through the second light transmissive area and the lens and made incident on the imaging device by driving the liquid crystal layer. A second distance to a subject in third and fourth images is calculated based on the third and fourth images. The third image is based on the light transmitted through the third light transmissive area and the lens and made incident on the imaging device by driving the liquid crystal layer. The fourth image is based on the light transmitted through the fourth light transmissive area and the lens and made incident on the imaging device by driving the liquid crystal layer.

Embodiments will be described hereinafter with reference to the accompanying drawings. The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restriction to the interpretation of the invention. In addition, in the specification and drawings, structural elements which function in the same or a similar manner to those described in connection with preceding drawings are denoted by like reference numbers, detailed description thereof being omitted unless necessary.

FIG. 1 is an exploded perspective view showing a configuration example of an electronic device 100 according to an embodiment. As shown in FIG. 1, the direction X, the direction Y, and the direction Z are orthogonal to each other but may intersect at an angle other than 90 degrees.

The electronic device 100 includes a liquid crystal display device DSP serving as a display device and a camera 1. The liquid crystal display device DSP includes a liquid crystal panel PNL serving as a display panel and an illumination device (backlight) IL.

The illumination device IL includes a light guide LG1, light sources EM, and a casing CS. Such an illumination device IL illuminates, for example, the liquid crystal panel PNL simply represented by a broken line in FIG. 1.

The light guide LG1 is formed in a flat panel shape parallel to an X-Y plane defined by the direction X and the direction Y. The light guide LG1 is opposed to the liquid crystal panel PNL. The light guide LG1 has a side surface SA, a side surface SB on the side opposite to the side surface SA, and a through hole h1 surrounding the camera 1. Each of the side surfaces SA and SB extends along the direction X. For example, the side surfaces SA and SB are planes parallel to an X-Z plane defined by the direction X and the direction Z. The through hole h1 penetrates the light guide LG1 along the direction Z. The through hole h1 is located between the side surfaces SA and SB and is closer to the side surface SB than to the side surface SA, in the direction Y.

A plurality of light sources EM are arranged at intervals in the direction X. Each of the light sources EM is mounted on the wiring board F1 and is electrically connected to the wiring board F1. For example, the light source EM1 is a light emitting diode (LED), which emits white illumination light. The illumination light emitted from the light sources EM1 is made incident on the light guide LG1 from the side surface SA to travel inside the light guide LG1 from the side surface SA toward the side surface SB.

The casing CS accommodates the light guide LG1 and the light sources EM1. The casing CS includes side walls W1 to W4, a bottom plate BP, a through hole h2, and a protrusion PP. The side walls W1 and W2 extend in the direction X and are opposed in the direction Y. The side walls W3 and W4 extend in the direction Y and are opposed in the direction X. The through hole h2 overlaps with the through hole h1 in the direction Z. The protrusion PP is fixed to the bottom plate BP. The protrusion PP protrudes from the bottom plate BP toward the liquid crystal panel PNL along the direction Z and surrounds the through hole h2.

The light guide LG1 overlaps with the liquid crystal panel PNL. The camera 1 is mounted on the wiring board F2 and is electrically connected to the wiring board F2. The camera 1 is opposed to the liquid crystal panel PNL through the through hole h2, the inside of the protrusion PP, and the through hole h1.

Figure 2:
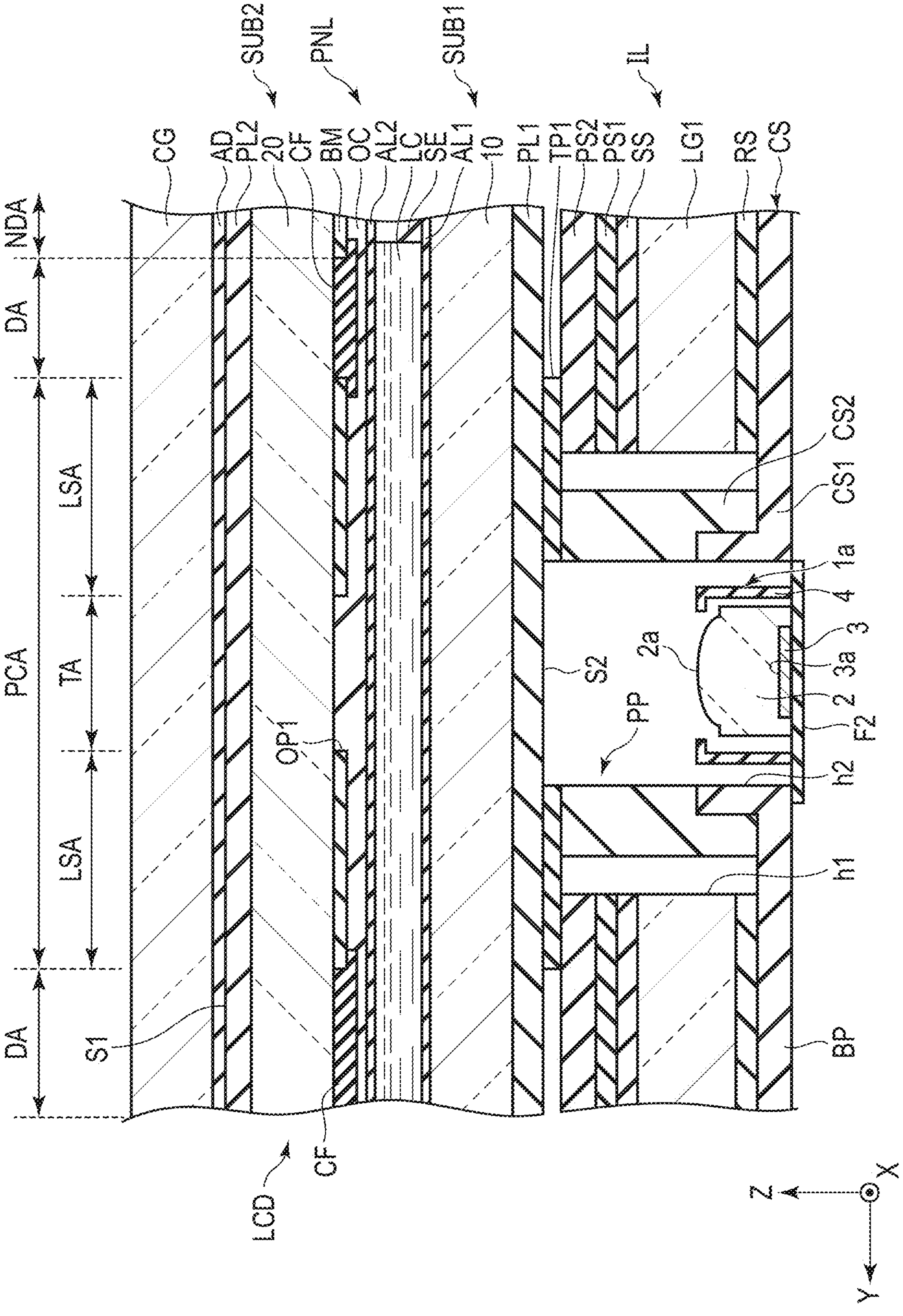
FIG. 2 is a cross-sectional view showing a surrounding of a camera of the electronic device.

FIG. 2 is a cross-sectional view showing the surrounding of the camera 1 of the electronic device 100. As shown in FIG. 2, the illumination device IL further includes a light reflective sheet RS, a light diffusion sheet SS, and prism sheets PS1 and PS2.

The light reflective sheet RS, the light guide LG1, the light diffusion sheet SS, the prism sheet PS1, and the prism sheet PS2 are provided in this order in the direction Z and are accommodated in the casing CS. The casing CS includes a metallic casing CS1 and a light-shielding wall CS2 formed of resin which serves as a peripheral member. The light-shielding wall CS2 is adjacent to the camera 1 to form the protrusion PP together with the casing CS1. The light-shielding wall CS2 is located between the camera 1 and the light guide LG1 and has a cylindrical shape. The light-shielding wall CS2 is formed of resin such as black resin, which absorbs light. Each of the light diffusion sheet SS, the prism sheet PS1, and the prism sheet PS2 includes a through hole which overlaps with the through hole h1. The protrusion PP is located inside the through hole h1.

The liquid crystal panel PNL further includes polarizers PL1 and PL2. The liquid crystal panel PNL and the cover glass CG serving as a cover member are provided in the Z direction and constitute a liquid crystal element LCD that includes an optical switching function for light traveling in the Z direction. The liquid crystal element LCD is attached to the illumination device IL with an adhesive tape TP1. The adhesive tape TP1 is adhered to the protrusion PP, the prism sheet PS2, and the polarizer PL1.

The liquid crystal panel PNL may have any configuration compliant with a display mode that uses a lateral electric field along the main surface of the substrate, a display mode that uses a longitudinal electric field along the normal of the main surface of the substrate, a display mode that uses an inclined electric field inclined in an oblique direction to the main surface of the substrate, or a display mode in which the lateral electric field, the longitudinal electric field, and the inclined electric field are used in appropriate combination. In this example, the main surface of the substrate is a surface parallel to the X-Y plane.

The liquid crystal panel PNL includes a display area DA where images are displayed, a non-display area NDA located outside the display area DA, and an incident light control area PCA surrounded by the display area DA and having a circular shape.

Incidentally, in the present embodiment, it will be described that the incident light control area PCA has a circular shape, but the shape of the incident light control area PCA may be a shape other than the circular shape.

The liquid crystal panel PNL includes a first substrate SUB1, a second substrate SUB2, a liquid crystal layer LC, and a sealing material SE. The sealing material SE is located in the non-display area NDA to join the first substrate SUB1 and the second substrate SUB2. The liquid crystal layer LC is arranged at a position overlapping with the display area DA and the incident light control area PCA, and is held between the first substrate SUB1 and the second substrate SUB2. The liquid crystal layer LC is formed in a space surrounded by the first substrate SUB1, the second substrate SUB2 and the sealing material SE.

Images are displayed on the display area DA by controlling the quantity of transmitted light emitted from the illumination device IL, on the liquid crystal panel PNL. The user of the electronic device 100 is located on the direction Z side of the cover glass CG and sees the light emitted from the liquid crystal panel PNL as images. In contrast, in the incident light control area PCA as well, the amount of transmitted light is controlled by the liquid crystal panel PNL, and the light is made incident on the camera 1 from the direction Z side of the cover glass CG via the liquid crystal panel PNL.

Incidentally, in the present embodiment, the light that travels from the illumination device IL to the cover glass CG side via the liquid crystal panel PNL is referred to as emitted light, and the light that travels from the cover glass CG side to the camera 1 through the liquid crystal panel PNL is referred to as incident light.

Main parts of the first substrate SUB1 and the second substrate SUB2 will be hereinafter described. The first substrate SUB1 includes an insulating substrate 10 and an alignment film AL1. The second substrate SUB2 includes an insulating substrate 20, a color filter CF, a light-shielding layer BM, a transparent layer OC, and an alignment film AL2.

The insulating substrates 10 and 20 are transparent substrates such as glass substrates or flexible resin substrates. The alignment films AL1 and AL2 are in contact with the liquid crystal layer LC.

The color filter CF, the light-shielding layer BM, and the transparent layer OC are located between the insulating substrate 20 and the liquid crystal layer LC. In the example illustrated, the color filter CF is provided on the second substrate SUB2, but may be provided on the first substrate SUB1. The color filter CF is located in the display area DA. The incident light control area PCA includes a light-shielding area LSA located at least on the outermost periphery and having an annular shape, and a light transmissive area TA surrounded by the light-shielding area LSA to be in contact with the light-shielding area LSA.

The light-shielding layer BM includes a light-shielding portion located in the display area DA to partition pixels and a light-shielding portion on the frame located in the non-display area NDA. In addition, the light-shielding layer BM is located at least in the light-shielding area LSA to form an opening OP1 located in the light transmissive area TA, in the incident light control area PCA.

The transparent layer OC is in contact with the color filter CF in the display area DA, in contact with the light-shielding layer BM in the non-display area NDA, in contact with the light-shielding layer BM in the light-shielding area LSA, and in contact with the insulating substrate 20 in the light transmissive area TA.

The alignment films AL1 and AL2 are provided across the display area DA, the incident light control area PCA, and the non-display area NDA.

Details of the color filter CF are omitted here, but the color filter CF includes, for example, a red colored layer provided on a pixel that displays red, a green colored layer provided on a pixel that displays green, and a blue colored layer provided on a pixel that displays blue. In addition, the color filter CF often includes a transparent resin layer provided on a pixel that displays white. The transparent layer OC covers the color filter CF and the light-shielding layer BM. For example, the transparent layer OC is a transparent organic insulating layer.

The camera 1 is provided inside the through hole h2 of the casing CS. The camera 1 overlaps with the cover glass CG and the liquid crystal panel PNL in the direction Z. Incidentally, the liquid crystal panel PNL may further include an optical sheet other than the polarizers PL1 and PL2, in the incident light control area PCA. Examples of such an optical sheet are a retardation film, a light scattering layer, an anti-reflective layer, and the like. In the electronic device 100 including the liquid crystal panel PNL, the camera 1, and the like, the camera 1 is provided on the back side of the liquid crystal panel PNL when viewed from the user of the electronic device 100.

The camera 1 includes, for example, an optical system 2 including at least one lens, an imaging device (image sensor) 3, and a casing 4. The imaging device 3 includes an imaging surface 3*a* which faces the liquid crystal panel PNL side. The optical system 2 is opposed to the incident light control area PCA of the liquid crystal panel PNL. The optical system 2 is located between the imaging surface 3*a* and the liquid crystal panel PNL, and includes a light incidence surface 2*a* which faces the liquid crystal panel PNL side. The light incidence surface 2*a* overlaps with the incident light control area PCA. The optical system 2 is located to be spaced apart from the liquid crystal panel PNL. The casing 4 accommodates the optical system 2 and the imaging device 3.

Incidentally, although omitted in FIG. 2, a light source for illuminating the subject to be captured with the camera 1 may be provided on an upper portion of the casing 4.

The imaging device 3 of the camera 1 receives light through the cover glass CG, the liquid crystal panel PNL, and the optical system 2. The imaging device 3 is configured to convert the incident light transmitted through the incident light control area PCA of the liquid crystal panel PNL, the optical system 2, and the like into images (data). Incidentally, the camera 1 (imaging device 3) is configured to convert, for example, visible light (for example, light in the wavelength range of 400 nm to 700 nm) that has passed through the cover glass CG and the liquid crystal panel PNL into images, but may be further configured to convert infrared light (for example, light in the wavelength range of 800 nm to 1500 nm) into images.

The polarizer PL1 is bonded to the insulating substrate 10. The polarizer PL2 is bonded to the insulating substrate 20. The cover glass CG is stuck to the polarizer PL2 with a transparent adhesive layer AD.

In addition, a transparent conductive layer may be provided between the polarizer PL2 and the insulating substrate 20 in order to avoid being affected by the electric field or the like from the liquid crystal layer LC. The transparent conductive layer is formed of a transparent conductive material such as indium tin oxide (ITO) or indium zinc oxide (IZO).

The liquid crystal panel PNL has a first surface S1 on the side where images are displayed and a second surface S2 on the side opposite to the first surface S1. In the present embodiment, the polarizer PL2 has the first surface S1, and the polarizer PL 1 has the second surface S2.

Incidentally, the display area DA and the incident light control area PCA are the areas overlapping with the first substrate SUB1, the second substrate SUB2, and the liquid crystal layer LC.

Figure 3:
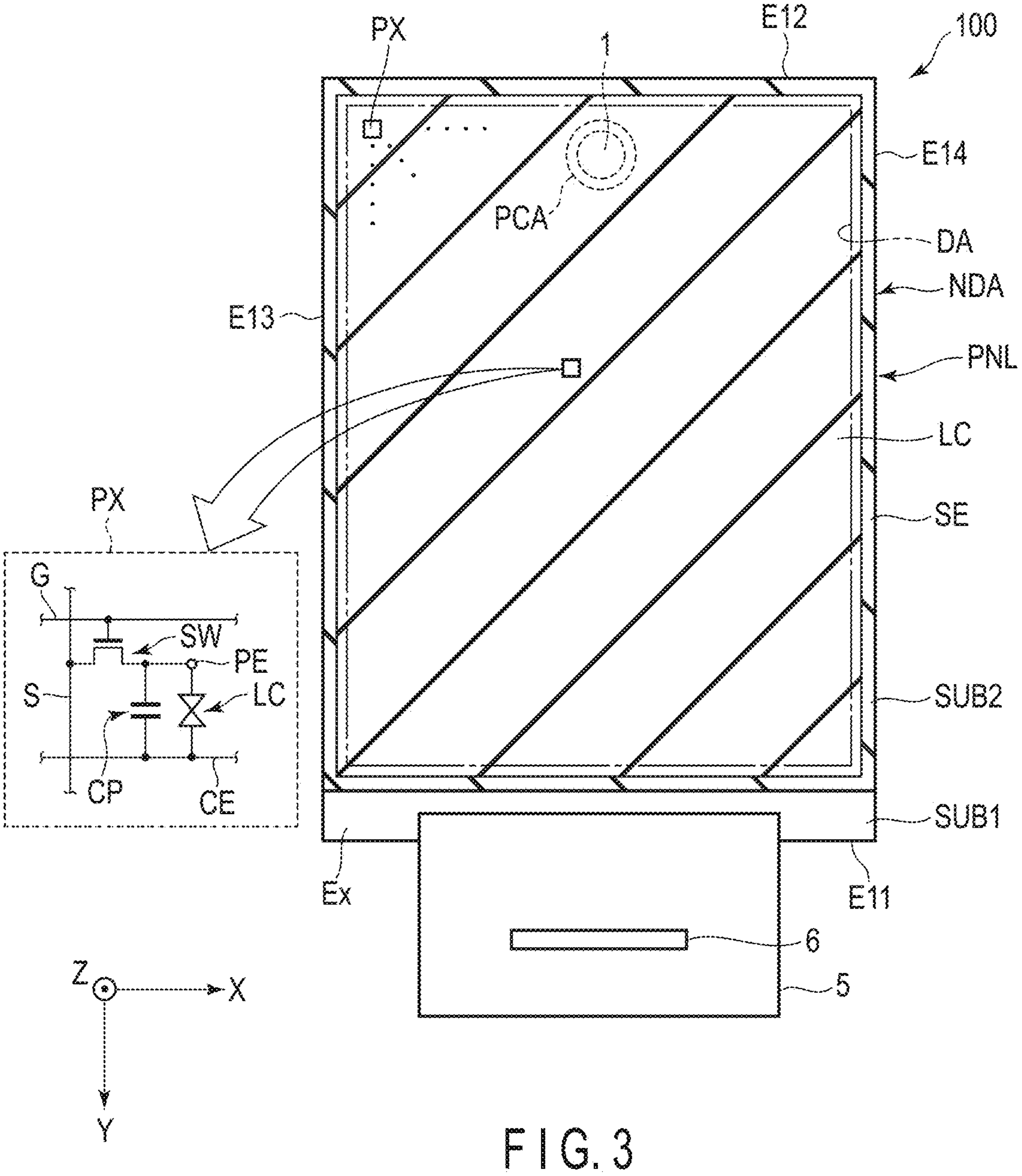

FIG. 3 is a plan view showing the arrangement of the liquid crystal panel PNL and camera 1 shown in FIG. 2, and the like. In addition, an equivalent circuit of one pixel PX is also shown in FIG. 3.

As shown in FIG. 3, the display area DA is a substantially quadrangular area, but the four corners may be rounded and the area may be shaped in a polygon other than a rectangle or a circular area. The display area DA is surrounded by the sealing material SE.

The liquid crystal panel PNL has a pair of short sides E11 and E12 extending along the direction X, and a pair of long sides E13 and E14 extending along the direction Y. The liquid crystal panel PNL includes a plurality of pixels PX arrayed in a matrix in the direction X and the direction Y, in the display area DA. Each pixel PX in the display area DA has the same circuit configuration.

As shown and enlarged in FIG. 3, each pixel PX includes a switching element SW, a pixel electrode PE, a common electrode CE, a liquid crystal layer LC, a capacitor CP, and the like.

The switching element SW is composed of, for example, a thin film transistor (TFT). The switching element SW is electrically connected to a corresponding scanning line G among the plurality of scanning lines G, a corresponding signal line S among the plurality of signal lines S, and the pixel electrode PE. A control signal for controlling the switching element SW is supplied to the scanning line G. An image signal such as a video signal is supplied to the signal line S as a signal different from the control signal.

A common voltage is supplied to the common electrode CE. The liquid crystal layer LC is driven with a voltage (electric field) generated between the pixel electrode PE and the common electrode CE.

For example, the capacitor CP is formed between an electrode having the same potential as the common electrode CE and an electrode having the same potential as the pixel electrode PE.

The liquid crystal panel PNL further includes a wiring board 5 and a driver 6 (display driver). The wiring board 5 is mounted on an extending portion Ex of the first substrate SUB1 and is connected to the extending portion Ex. The driver 6 is mounted on the wiring board 5 and is electrically connected to the wiring board 5. Incidentally, the driver 6 may be mounted on the extending portion Ex and electrically connected to the extending portion Ex. The driver 6 is configured to drive the liquid crystal panel PNL (liquid crystal layer LC) by outputting, for example, a signal necessary for image display, and is mounted as an IC chip. The wiring board 5 may be a foldable flexible printed circuit board.

In FIG. 3, the electronic device 100 includes a camera 1 in the display area DA, and the camera 1 is provided at the upper center of the display area DA in the plan view shown in FIG. 3. In addition, the incident light control area PCA is arranged at a position overlapping with the camera 1.

Figure 4:
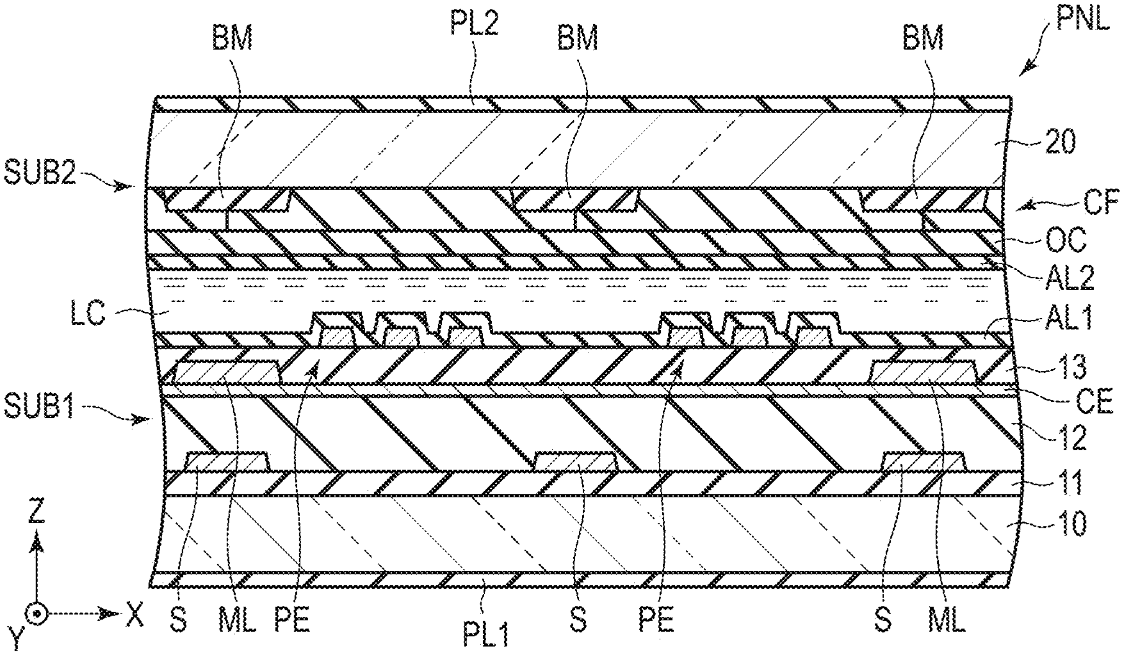
FIG. 4 is a cross-sectional view showing pixels of the liquid crystal panel.

FIG. 4 is a cross-sectional view showing the pixel PX of the liquid crystal panel PNL. FIG. 4 shows a configuration of a liquid crystal panel PNL compatible with Fringe Field Switching (FFS) mode, which is one of the display modes utilizing the lateral electric field.

As shown in FIG. 4, the first substrate SUB1 includes the insulating layer 11, the signal lines S, the insulating layer 12, the common electrode CE, the metal layer ML, the insulating layer 13, the pixel electrodes PE, and the like between the insulating substrate 10 and the alignment film AL1. In addition, a polarizer PL1 is formed outside the first substrate SUB1.

The insulating layer 11 is provided on the insulating substrate 10. Although detailed descriptions are omitted, the above-described scanning line G, a gate electrode and a semiconductor layer of the switching element SW, the other insulating layers, and the like are provided between the insulating substrate 10 and the insulating layer 11. The signal lines S are formed on the insulating layer 11. The insulating layer 12 is provided on the insulating layer 11 and the signal lines S.

The common electrode CE is provided on the insulating layer 12. The metal layer ML is provided on the common electrode CE and is in contact with the common electrode CE. The metal layer ML is located just above the signal lines S. Incidentally, in the example shown in FIG. 4, the first substrate SUB1 includes the metal layer ML, but the metal layer ML may be omitted. The insulating layer 13 is provided on the common electrode CE and the metal layer ML.

The pixel electrodes PE are formed on the insulating layer 13. Each of the pixel electrodes PE is located between the adjacent signal lines S and is opposed to the common electrode CE. In addition, the pixel electrode PE includes a slit at a position opposed to the common electrode CE. The common electrode CE and the pixel electrode PE are formed of a transparent conductive material such as ITO or IZO.

The insulating layer 13 is sandwiched between the common electrode CE and the pixel electrode PE. The alignment film AL1 is provided on the insulating layer 13 and the pixel electrodes PE to cover the pixel electrodes PE and the like.

In contrast, the second substrate SUB2 includes a light shielding layer BM, a color filter CF, a transparent layer OC, an alignment film AL2, and the like on the side of the insulating substrate 20, which faces the first substrate SUB1.

The light shielding layer BM is formed on the inner surface of the insulating substrate 20. The light shielding layer BM is located just above the signal lines S and the metal layer ML. The color filter CF is formed on the inner surface of the insulating substrate 20 and partially overlaps with the light shielding layer BM. The transparent layer OC covers the color filter CF. The alignment film AL2 covers the transparent layer OC. In addition, the polarizer PL2 is formed outside the second substrate SUB2.

Incidentally, the liquid crystal panel PNL can be configured to form no light shielding layer BM in the display area DA. In this case, for example, the metal layer ML can be formed in a grating shape, and the metal layer ML can be made to have a light shielding function instead of the light shielding layer BM, in the display area DA.

In this example, for example, the transmission axes of the polarizers PL1 and PL2 are orthogonal to each other and, in the pixel PX, the liquid crystal molecules contained in the liquid crystal layer LC are initially aligned in the transmission axis direction of the polarizer PL1 between the alignment films AL1 and AL2 in an off state in which no voltage (electric field) is generated between the pixel electrode PE and the common electrode CE and no voltage is applied to the liquid crystal layer LC. Therefore, since no phase difference occurs in the liquid crystal layer LC and the transmission axes of the polarizers PL1 and PL2 are orthogonal to each other, the pixel PX has the minimum transmittance and displays black. In other words, the liquid crystal panel PNL exerts the light shielding function in the pixel PX.

In contrast, in the pixel PX, the liquid crystal molecules are aligned in a direction different from the initial alignment direction and the alignment direction is controlled by the electric field in an on state in which a voltage (electric field) generated between the pixel electrode PE and the common electrode CE is applied to the liquid crystal layer LC. For this reason, a phase difference occurs in the liquid crystal layer LC, and the liquid crystal panel PNL exerts the light transmitting (light transmission) function in the pixel PX. Therefore, the pixel PX in the on state displays a color according to the color filter.

The mode of the liquid crystal panel PNL in the present embodiment is assumed to be a normally black mode that displays black in the off state, but may be a normally white mode that displays black in the on state (displays white in the off state).

The electrode closer to the liquid crystal layer LC, of the pixel electrode PE and the common electrode CE, is the pixel electrode PE, and the pixel electrode PE functions as the display electrode as described above. However, one of the pixel electrode PE and the common electrode CE, which is closer to the liquid crystal layer LC may be the common electrode CE. In this case, the common electrode CE is formed to have a slit and functions as a display electrode.

Figure 5:
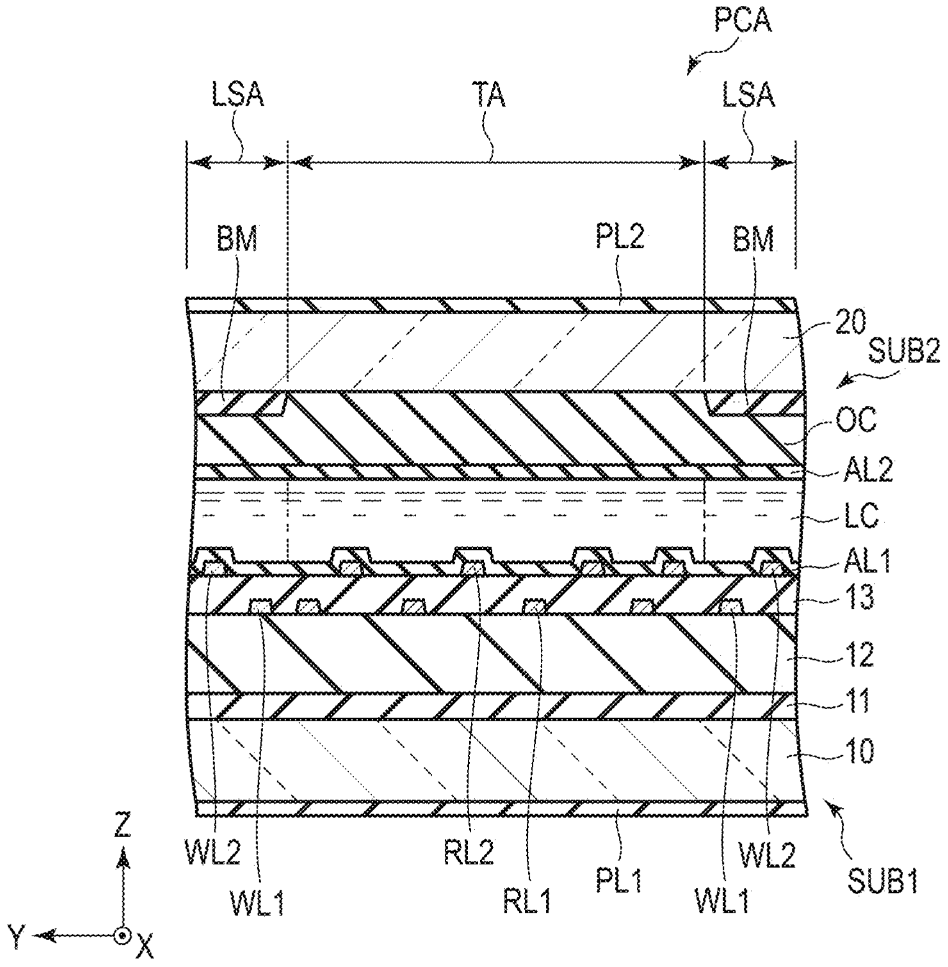
FIG. 5 is a cross-sectional view showing an incident light control area of the liquid crystal panel.

FIG. 5 is a cross-sectional view showing the incident light control area PCA of the liquid crystal panel PNL. In FIG. 5, the signal lines S, the scanning lines G, and the like are omitted. In addition, in FIG. 5, the same parts as those in FIG. 4 described above are denoted by the same reference numerals, and their detailed descriptions are omitted.

As shown in FIG. 5, one of the two conductors formed with the insulating layer 13 sandwiched therebetween is provided in the same layer as one of the pixel electrode PE and the common electrode CE, and is formed of the same material as the electrode. In addition, the other of the two conductors described above is provided in the same layer as the other electrode of the pixel electrode PE and the common electrode CE, and is formed of the same material as the other electrode.

In FIG. 5, the first wire WL1 and the first control electrode RL1 are provided on the insulating layer 12 and are covered with the insulating layer 13. The first wire WL1 and the first control electrode RL1 are provided in the same layer as the common electrode CE, and are formed of the same transparent conductive material as the common electrode CE.

The second wire WL2 and the second control electrode RL2 are provided on the insulating layer 13 and are covered with the alignment film AL1. The second wire WL2 and the second control electrode RL2 are provided in the same layer as the pixel electrode PE, and are formed of the same transparent conductive material as the pixel electrode PE.

In the example shown in FIG. 5, the insulating layer 13 is sandwiched between the first control electrode RL1 and the second control electrode RL2, but the first control electrode RL1 and the second control electrode RL2 may be formed in the same layer.

In the incident light control area PCA, the alignment film AL1 covers the second wire WL2 and the second control electrode RL2 and is in contact with the liquid crystal layer LC.

In the second substrate SUB2, the color filter CF is not provided in the incident light control area PCA.

A voltage generated by the first control electrode RL1 and the second control electrode RL2 is applied to the liquid crystal layer LC. In this case, a first control voltage is applied to the first control electrode RL1 and a second control voltage is applied to the second control electrode RL2 via a wiring line (not shown), but the first control voltage may have the same voltage level as one of the image signal and the common voltage, and the second control voltage may have the same voltage level as the other of the image signal and the common voltage.

In addition, the first control voltage may have a voltage level of a first polarity with respect to the common voltage, and the second control voltage may have a voltage level of a second polarity with respect to the common voltage. Incidentally, one of the first polarity and the second polarity described above is positive polarity, and the other is negative polarity.

Incidentally, in the present embodiment, the liquid crystal layer LC provided at a position overlapping with the incident light control area PCA is driven so as to transmit light to the light transmissive area TA, but such control is executed by the driver 6 provided in the liquid crystal panel PNL.

When the mode of the above-described liquid crystal panel PNL is, for example, a normally black mode, the driver 6 transmits light through the light transmissive area TA by applying a voltage generated by the control electrode RL1 and the second control electrode RL2 to the liquid crystal layer LC formed at the position overlapping with the incident light control area PCA (light transmissive area TA) (i.e., setting the liquid crystal layer LC in the on state). According to this, the light transmitted through the light transmissive area TA is made incident on the imaging device 3, and the imaging device 3 can convert the incident light into an image.

In contrast, the driver 6 can prevent light from being transmitted through the light transmissive area TA by applying no voltage to the liquid crystal layer LC formed at the position overlapping with the incident light control area PCA (light transmissive area TA) (i.e., by setting the liquid crystal layer LC in the off state).

Incidentally, in the present embodiment, it is considered that the distance from the camera 1 to a subject in the image (hereinafter simply referred to as the distance to the subject) is calculated using an image based on the light transmitted through the light transmissive area TA and made incident on the imaging device 3 (i.e., a subject image captured by the camera 1) as described above.

For example, a coded aperture technique can be used as a technique for calculating the distance to the subject from an image. Although detailed explanations are omitted, the coded aperture technique is a technique of calculating the distance to the subject by analyzing blur which occurs in an image depending on the position of the subject.

In other words, by using the above-described coded aperture technique, the electronic device 100 can be used for purposes such as calculating the distance to the subject based on an image and creating a depth map representing the distance to the subject. Incidentally, the process of calculating the distance to the subject, the process of creating the depth map, and the like may be executed by a CPU or the like included in the electronic device 100 that operates according to a predetermined application program.

An overview of the camera module used to calculate the above-described distance to the subject will be hereinafter described with reference to FIG. 6 and FIG. 7. Incidentally, in the present embodiment, the camera module is assumed to include a camera 1 (an optical system 2 including a lens and an imaging device 3) for capturing the subject, and the liquid crystal panel PNL for driving the liquid crystal layer LC so as to make light incident on the imaging device 3 through the light transmissive area TA.

Figure 6:
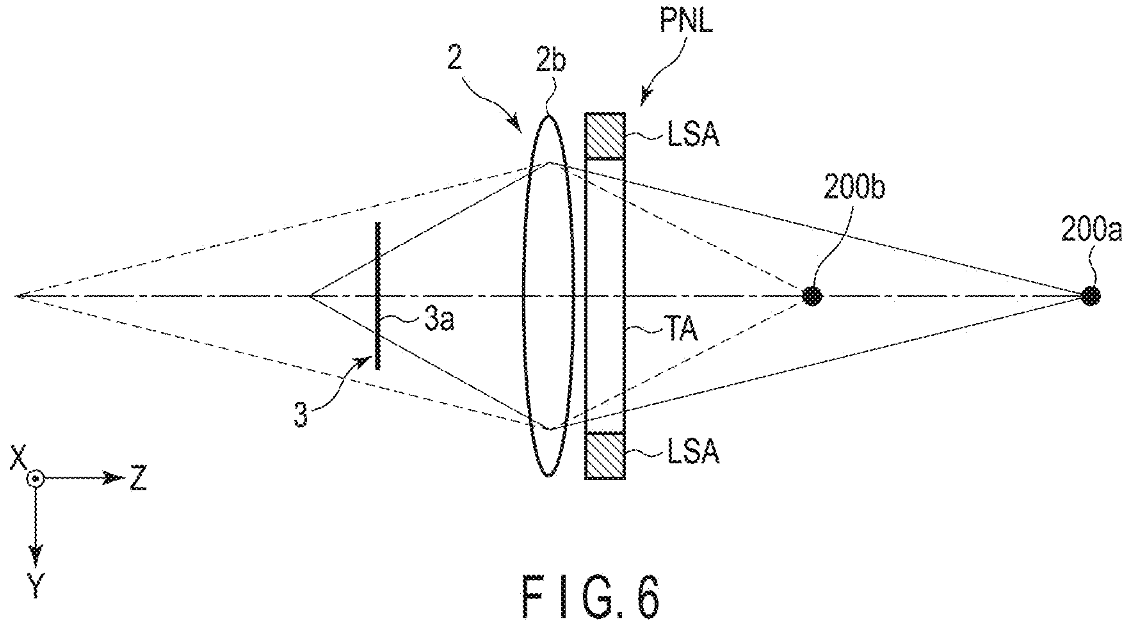
FIG. 6 is a diagram for illustrating an overview of a camera module used to calculate the distance to a subject.

FIG. 6 shows a positional relationship between the camera module and the subject. First, in FIG. 6, calculating the distance to a subject 200*a* located relatively far from the camera 1 (electronic device 100) is assumed. Generally, in the camera 1, for example, a subject 200*a* can be captured in a state in which the subject 200*a* is focused by changing the distance between the lens 2*b* included in the optical system 2 and the imaging device 3. As shown in FIG. 6, however, when the subject 200*a* is captured in a state in which the subject 200*a* is out of focus, an image based on the light made incident on the imaging device 3 is blurred since the imaging position and the position of the imaging surface 3*a* of the imaging device 3 are displaced.

According to the above-described coded aperture technique, the distance to the subject 200*a* is calculated based on the blur that occurs in the image in this manner.

Next, calculating the distance from the camera 1 to a subject 200*b* located relatively close to the camera 1 is assumed. When calculating the distance to the subject 200*b*, the subject 200*b* is captured in the state in which the subject 200*b* is out of focus as described above. However, when the distance from the camera 1 to the subject 200*b* is short as shown in FIG. 6, part of the light that has transmitted through the light transmissive area TA and the lens 2*b* is not made incident on the imaging device 3. In this case, even if the distance from the image based on the light made incident on the imaging device 3 to the subject 200*b* is calculated, information on the light (blur) that is not made incident on the imaging device 3 cannot be used to calculate the distance to the subject 200*b*, and it is considered that an error occurs in the distance (i.e., the accuracy of the distance becomes low).

Figure 7:
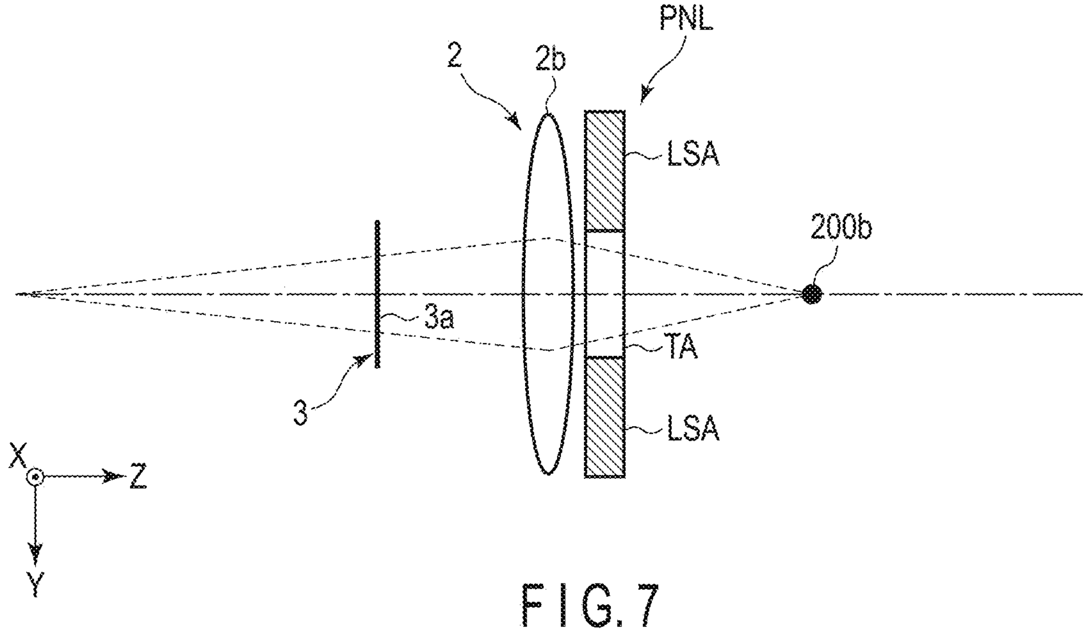
FIG. 7 is a diagram for illustrating an overview of a camera module used to calculate the distance to a subject.

In this case, as shown in, for example, FIG. 7, all of the light that has been transmitted through the light transmissive area TA and the lens 2*b* can be made incident on the imaging device 3 by reducing the size of the light transmissive area TA. According to this, the accuracy of the distance to the subject 200*b* can be improved compared to the case in which the size of the light transmissive area TA is large as shown in FIG. 6 described above.

Incidentally, if the size of the light transmissive area TA is reduced, the amount of light made incident on the imaging device 3 decreases and, for this reason, it is undesirable to use a small size of the light transmissive area TA at any time.

Figure 8:
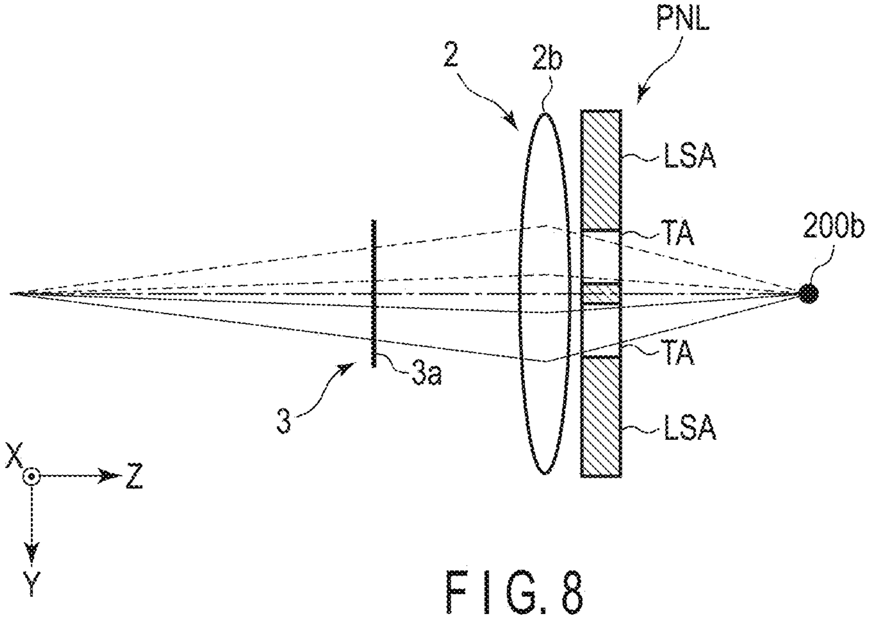
FIG. 8 is a diagram for illustrating a coded aperture pair.

Therefore, in the present embodiment, a configuration in which the size of the light transmissive area TA can be changed is adopted in consideration of the case in which the subject is located far from the camera 1 and the case in which the subject is located close to the camera 1. In addition, when calculating the distance of a subject from an image as described above, two light transmissive areas TA (encoded aperture pair) are prepared as shown in, for example, FIG. 8, and it is considered that using (the blur generated in) the image based on one of the light transmissive areas TA and (the blur generated in) the image based on the other light transmissive area TA contributes to the improvement of the accuracy of distance.

Figure 9:
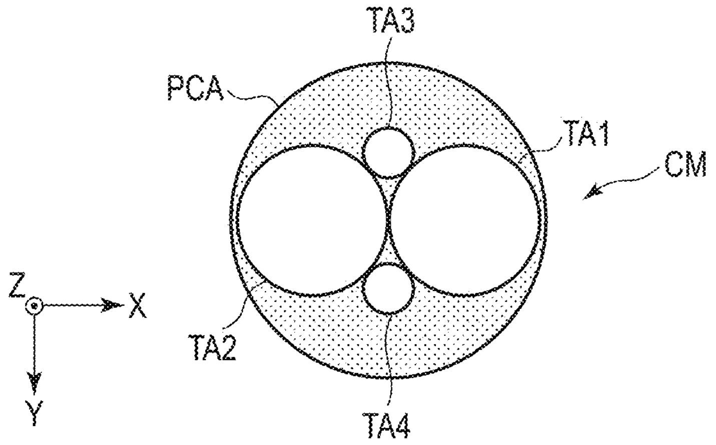
FIG. 9 is a plan view schematically showing an example of the incident light control area of the liquid crystal panel.

The configuration of the camera module according to the present embodiment will be described below. FIG. 9 is a plan view schematically showing the incident light control area PCA of the liquid crystal panel PNL provided in the camera module of the present embodiment.

As shown in FIG. 9, in the camera module CM according to the present embodiment, the liquid crystal panel PNL includes an incident light control area PCA including a plurality of light transmissive areas TA. More specifically, in the example shown in FIG. 9, the incident light control area PCA includes first to fourth light transmissive areas TA1 to TA4.

In the present embodiment, the size and shape of the first light transmissive area TA1 are the same as the size and shape of the second light transmissive area TA2. Incidentally, the first light transmissive area TA1 and the second light transmissive area TA2 constitute a first coded aperture pair.

In addition, the size and shape of the third light transmissive area TA3 are the same as the size and shape of the fourth light transmissive area TA4. Incidentally, the third light transmissive area TA3 and the fourth light transmissive area TA4 constitute a second coded aperture pair.

Furthermore, in the present embodiment, the size of the first light transmissive area TA1 and the second light transmissive area TA2 is smaller than the size of the third light transmissive area TA3 and the fourth light transmissive area TA4.

In other words, in the present embodiment, two (2 pairs) coded aperture pairs are prepared, and one of the two coded aperture pairs is formed to have a pinhole-like size, such that the distance to the subject can be calculated with high accuracy even if the subject is located at a short distance. In other words, the first coded aperture pair composed of the first light transmissive area TA1 and the second light transmissive area TA2 is a suitable coded aperture pair in the case where the subject is located at a short distance from the camera 1, and the second coded aperture pair composed of the third light transmissive area TA3 and the fourth light transmissive area TA4 is a suitable coded aperture pair in the case where the subject is located at a middle or long distance from the camera 1.

Incidentally, regarding the short distance aperture, the size and shape of the first light transmissive area TA1 may not be the same as the size and shape of the second light transmissive area TA2. In addition, regarding the middle distance or the long distance, the size and shape of the third light transmissive area TA3 may not be the same as the size and shape of the fourth light transmissive area TA4.

Figure 10:
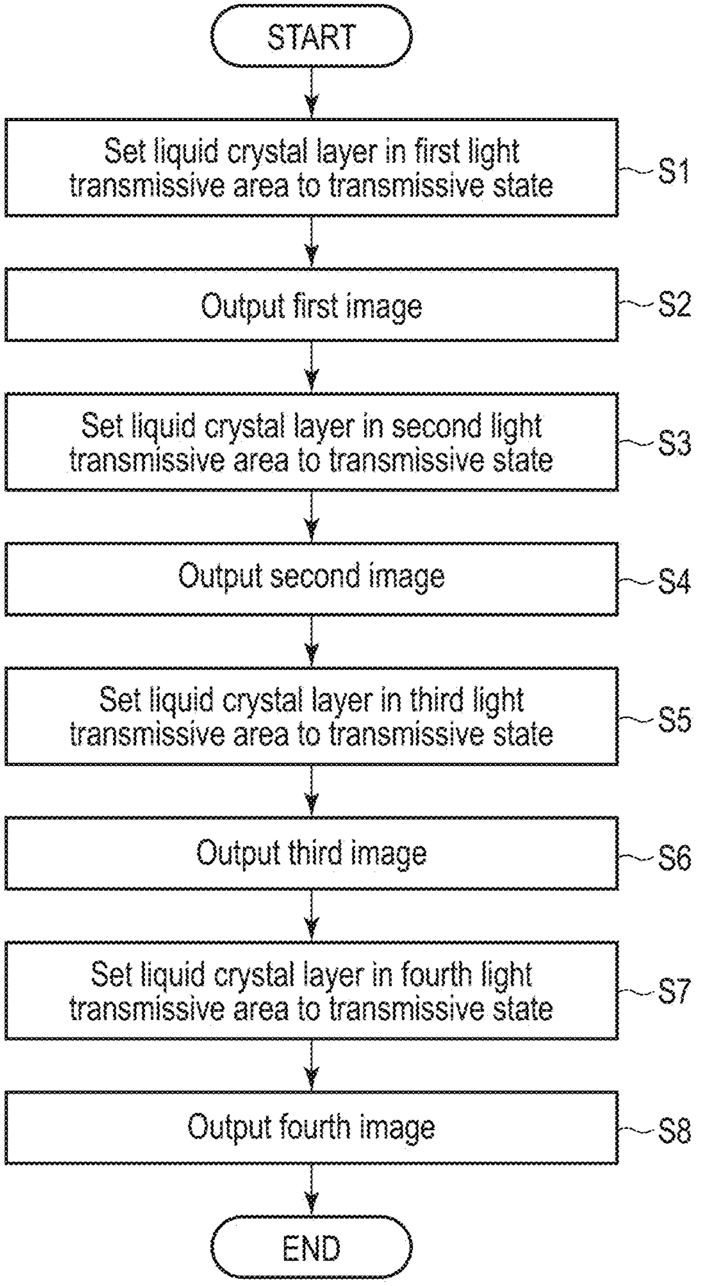
FIG. 10 is a flowchart showing an example of the operation of the camera module when calculating the distance to the subject.

Next, an example of the operation of the camera module when calculating the distance to the subject will be described with reference to a flowchart in FIG. 10.

First, the subject needs to be captured with the camera 1 in order to calculate the distance to the subject and, in this case, the driver 6 provided in the liquid crystal panel PNL applies a voltage to the liquid crystal layer LC formed at a position overlapping with the first light transmissive area TA1 (hereinafter referred to as the liquid crystal layer LC in the first light transmissive area TA1) and sets the liquid crystal layer LC to a transmissive state in order to transmit light to the first light transmissive area TA1 (step S1). In this case, the liquid crystal layer LC formed at a position overlapping with the second light transmissive area TA2 (hereinafter referred to as the liquid crystal layer LC in the second light transmissive area TA2), the liquid crystal layer LC formed at a position overlapping with the third light transmissive area TA3 (hereinafter referred to as the liquid crystal layer LC in the third light transmissive area TA3), and the liquid crystal layer LC formed at a position overlapping with the fourth light transmissive area TA4 (hereinafter referred to as the liquid crystal layer LC in the fourth light transmissive area TA4) are in a non-transmissive state.

When the process of step S1 is executed, an image (hereinafter referred to as a first image) based on the light (incident light) that has been transmitted through the first light transmissive area TA1 and made incident on the imaging device 3 is output (step S2).

Next, the driver 6 sets the liquid crystal layer LC in the second light transmissive area TA2 to a transmissive state in order to transmit light to the second light transmissive area TA2 (step S3). In this case, the liquid crystal layer LC in each of the first light transmissive area TA1, the third light transmissive area TA3, and the fourth light transmissive area TA4 is in a non-transmissive state.

When the process of step S3 is executed, an image (hereinafter referred to as a second image) based on the light (incident light) transmitted through the second light transmissive area TA2 and made incident on the imaging device 3 is output (step S4).

In this case, (CPU or the like of) the electronic device 100 executes a process of calculating the distance to the subject based on the blur that occurs in the first image output in step S2 and the second image output in step S4.

Next, the driver 6 sets the liquid crystal layer LC in the third light transmissive area TA3 to a transmissive state in order to transmit light to the third light transmissive area TA3 (step S5). In this case, the liquid crystal layer LC in each of the first light transmissive area TA1, the second light transmissive area TA2, and the fourth light transmissive area TA4 is in a non-transmissive state.

When the process of step S5 is executed, an image (hereinafter referred to as a third image) based on the light (incident light) transmitted through the third light transmissive area TA3 and made incident on the imaging device 3 is output (step S6).

Furthermore, the driver 6 sets the liquid crystal layer LC in the fourth light transmissive area TA4 to a transmissive state in order to transmit light to the fourth light transmissive area TA4 (step S7). In this case, the liquid crystal layer LC in each of the first light transmissive area TA1, the second light transmissive area TA2, and the third light transmissive area TA3 is in a non-transmissive state.

When the process of step S7 is executed, an image (hereinafter referred to as a fourth image) based on the light (incident light) transmitted through the fourth light transmissive area TA4 and made incident on the imaging device 3 is output (step S8).

In this case, (CPU or the like of) the electronic device 100 executes a process of calculating the distance to the subject based on the blur that occurs in the third image output in step S6 and the fourth image output in step S8.

As described above, the camera module CM according to the present embodiment includes the imaging device 3, the liquid crystal panel PNL, and the lens 2*b*, and the liquid crystal panel PNL includes the incident light control area PCA including the first to fourth light transmissive areas TA1 to TA4 provided at the positions where light is made incident on the imaging device 3, the liquid crystal layer LC provided at the position overlapping with the incident light control area PCA, and the driver 6 which drives the liquid crystal layer LC to transmit light through each of the first to fourth light transmissive areas TA1 to TA4. In addition, in the present embodiment, the size of the third and fourth light transmissive areas TA3 and TA4 is smaller than the size of the first and second light transmissive areas TA1 and TA2.

In the present embodiment, the first distance to the subject in the first and second images is calculated based on the first image based on the light transmitted through the first light transmissive area TA1 and the lens 2*b* and made incident on the imaging device 3 by driving the liquid crystal layer LC, and the second image based on the light transmitted through the second light transmissive area TA2 and the lens 2*b* and made incident on the imaging device 3 by driving the liquid crystal layer LC. In addition, in the present embodiment, the second distance to the subject in the third and fourth images is calculated based on the third image based on the light transmitted through the third light transmissive area TA3 and the lens 2*b* and made incident on the imaging device 3 by driving the liquid crystal layer LC, and the fourth image based on the light transmitted through the fourth light transmissive area TA4 and the lens 2*b* and made incident on the imaging device 3 by driving the liquid crystal layer LC.

In this embodiment, with the above-described configuration, for example, since the first distance can be used when the subject is located relatively far from the camera 1 (electronic device 100), and since the second distance can be used when the subject is located relatively close to the camera 1 (electronic device 100), degradation in the accuracy of the distance to the subject calculated when the subject is located at a short distance as described above in FIG. 6 can be avoided (i.e., the accuracy of the distance calculated from images can be improved).

Incidentally, for example, a configuration of using an image based on light made incident through a grating pattern or the like may be considered in order to improve the accuracy of the distance to the subject calculated from the image but, in the present embodiment, labor of preparing and arranging a grating pattern can be reduced as compared to such a configuration.

In the present embodiment, the example has been described in which as shown in FIG. 9, the first light transmissive area TA1 and the second light transmissive area TA2 are arranged side by side in the direction X and that the third light transmissive area TA3 and the fourth light transmissive area TA4 are arranged side by side in the direction Y, but the incident light control area PCA may be configured such that the first light transmissive area TA1 and the second light transmissive area TA2 are arranged side by side in the direction Y and that the third light transmissive area TA3 and the fourth light transmissive area TA4 are arranged side by side in the direction X.

In addition, for example, if the distance calculated based on the first image based on the incident light that has been transmitted through the first light transmissive area TA1 and the second image based on the incident light that has been transmitted through the second light transmissive area TA2 is assumed to be represented using, for example, three-dimensional coordinates, and if the first light transmissive area TA1 and the second light transmissive area TA2 are arranged side by side in the direction X as shown in FIG. 9, an error in the direction Y (i.e., the Y coordinate) may occur during the calculation of the distance to the subject. Similarly, for example, if the distance calculated based on the third image based on the incident light that has been transmitted through the third light transmissive area TA3 and the fourth image based on the incident light that has been transmitted through the fourth light transmissive area TA4 is assumed to be represented using, for example, three-dimensional coordinates, and if the third light transmissive area TA3 and the fourth light transmissive area TA4 are arranged side by side in the direction X as shown in FIG. 9, an error in the direction X (i.e., the X coordinate) may occur during the calculation of the distance to the subject.

Figure 11:
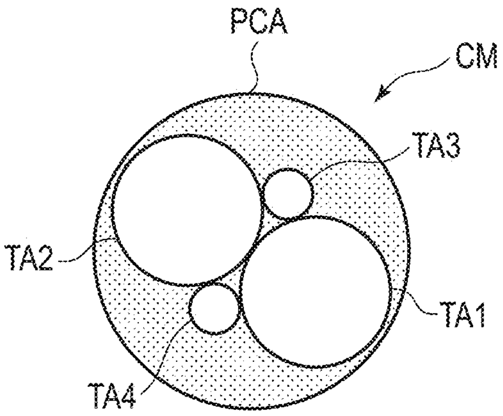
FIG. 11 is a plan view schematically showing another example of the incident light control area of the liquid crystal panel.

For this reason, the first to fourth light transmissive areas TA1 to TA4 may be arranged as shown in FIG. 11 in the incident light control area PCA in the present embodiment. In the example shown in FIG. 11, the first light transmissive area TA1 and the second light transmissive area TA2 are arranged side by side in a diagonal direction with respect to the direction X (or the direction Y). In contrast, the third light transmissive area TA1 and the fourth light transmissive area TA4 are arranged side by side in a direction orthogonal to the direction in which the first light transmissive area TA1 and the second light transmissive area TA2 are arranged side by side. In other words, the incident light control area PCA shown in FIG. 11 corresponds to a configuration obtained by rotating the incident light control area PCA shown in FIG. 9 to the rightward direction by 22.5 degrees. According to such a configuration, the above-described error in the direction X or the direction Y may be able to be decreased.

In addition, in the present embodiment, a first coded aperture pair composed of the first light transmissive area TA1 and the second light transmissive area TA2, and a second coded aperture pair composed of the third light transmissive area TA3 and the fourth light transmissive area TA4 may be prepared. Therefore, the incident light control area PCA in the present embodiment may be configured as shown in, for example, FIG. 12. In the incident light control area PCA shown in FIG. 12, the first to fourth light transmissive areas TA1 to TA4 are configured such that the center of the first light transmissive area TA1 corresponds to the center of the third light transmissive area TA3 and that the center of the second light transmissive area TA2 corresponds to the center of the fourth light transmissive area TA4. In the present embodiment, even if the incident light control area PCA (first to fourth light transmissive areas TA1 to TA4) is configured as shown in FIG. 12, the same processing as that shown in FIG. 10 may be executed.

Figure 12:
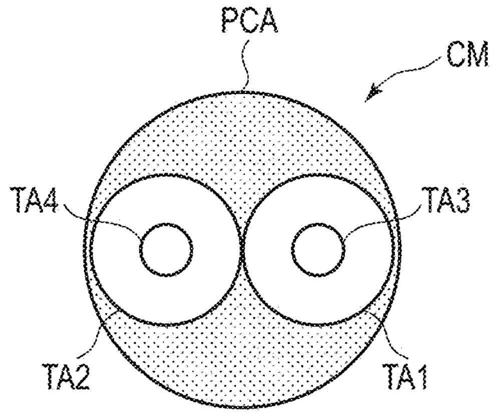
FIG. 12 is a plan view schematically showing yet another example of the incident light control area of the liquid crystal panel.

Incidentally, in the configuration shown in FIG. 12, the center of the first light transmissive area TA1 and the center of the third light transmissive area TA3 correspond to each other and the center of the second light transmissive area TA2 and the center of the fourth light transmissive area TA4 correspond to each other, but these center axes may be displaced.

In FIG. 12, the first light transmissive area TA1 (third light transmissive area TA3) and the second light transmissive area TA2 (fourth light transmissive area TA4) are arranged side by side in the direction X, but the first light transmissive area TA1 (third light transmissive area TA3) and the second light transmissive area TA2 (fourth light transmissive area TA4) may be arranged side by side in the direction Y or may be arranged in an oblique direction with respect to the direction X and the direction Y.

Furthermore, in the present embodiment, it has been described that two pairs of coded apertures with different sizes of light transmissive areas are prepared, but three or more pairs of coded apertures with different sizes of light transmissive areas may be provided.

In addition, in the present embodiment, it has been described that the shape of the first to fourth light transmissive areas TA1 to TA4 included in the incident light control area PCA is a circular shape, but the first to fourth light transmissive areas TA1 to TA4 may have a shape other than a circular shape (for example, a rectangular shape or the like).

Furthermore, in the present embodiment, it has been described that the first image based on the incident light transmitted through the first light transmissive area TA1, the second image based on the incident light transmitted through the second light transmissive area TA2, the third image based on the incident light transmitted through the third light transmissive area TA3, and the fourth image based on the incident light transmitted through the fourth light transmissive area TA4 are output in order to calculate the distance to the subject in the electronic device 100 but, for example, if the distance from the camera 1 (electronic device 100) to the subject is greater than or equal to a predetermined value (i.e., the subject is located at a middle or long distance), the liquid crystal layer LC may be driven to transmit light through the first light transmissive area TA1 and the second light transmissive area TA2 (i.e., the first and second images may be output). In contrast, when the distance from the camera 1 (electronic device 100) to the subject is less than a predetermined value (i.e., the subject is located at a short distance), the liquid crystal layer LC may be driven to transmit light through the third light transmissive area TA3 and the fourth light transmissive area TA4 (i.e., the third and fourth images may be output).

Incidentally, as described above, the distance to the subject for determining (selecting) the light transmissive area where light is transmitted does not have to be an accurate value, and may be measured using a predetermined sensor or may be specified by the user of the electronic device 100.

In addition, in the present embodiment, an image based on incident light that has been transmitted through one of the first to fourth light transmissive areas TA1 to TA4 is used to calculate the distance to the subject and, for example, the distance to the subject may be calculated using an image based on incident light that has been transmitted through two (or three) of the first to fourth light transmissive areas TA1 to TA4.

Alternatively, in the present embodiment, it has been described that the distance to the subject is calculated using the first to fourth images output from the camera module CM, but the first to fourth images may be used to generate, for example, omnifocal images of the subject.

All camera modules, which are implementable with arbitrary changes in design by a person of ordinary skill in the art based on the camera modules described above as the embodiments of the present invention, belong to the scope of the present invention as long as they encompass the spirit of the present invention.

Various modifications are easily conceivable within the category of the idea of the present invention by a person of ordinary skill in the art, and these modifications are also considered to belong to the scope of the present invention. For example, additions, deletions or changes in design of the constituent elements or additions, omissions or changes in condition of the processes may be arbitrarily made to the above embodiments by a person of ordinary skill in the art, and these modifications also fall within the scope of the present invention as long as they encompass the spirit of the present invention.

In addition, the other advantages of the aspects described in the above embodiments, which are obvious from the descriptions of the specification or which are arbitrarily conceivable by a person of ordinary skill in the art, are considered to be achievable by the present invention as a matter of course.

What is claimed is:

1. A camera module comprising:

an imaging device;

a liquid crystal panel comprising an incident light control area including first to fourth light transmissive areas provided at positions where light is made incident on the imaging device, a liquid crystal layer provided at a position overlapping with the incident light control area, and a driver driving the liquid crystal layer to transmit light through each of the first to fourth light transmissive areas; and a lens located between the imaging device and the liquid crystal panel, wherein a size of the third and fourth light transmissive areas is smaller than a size of the first and second light transmissive areas, a first distance to a subject in first and second images is calculated based on the first and second images, the first image being based on the light transmitted through the first light transmissive area and the lens and made incident on the imaging device by driving the liquid crystal layer, and the second image being based on the light transmitted through the second light transmissive area and the lens and made incident on the imaging device by driving the liquid crystal layer, a second distance to a subject in third and fourth images is calculated based on the third and fourth images, the third image being based on the light transmitted through the third light transmissive area and the lens and made incident on the imaging device by driving the liquid crystal layer, and the fourth image being based on the light transmitted through the fourth light transmissive area and the lens and made incident on the imaging device by driving the liquid crystal layer, and the driver is configured to drive the liquid crystal layer to transmit light through the first and second light transmissive areas when a distance to the subject is larger than or equal to a predetermined value, and drive the liquid crystal layer to transmit light through the third and fourth light transmissive areas when a distance to the subject is less than the predetermined value.

2. The camera module of claim 1, wherein the first and second light transmissive areas are provided side by side in a first direction, and the third and fourth light transmissive areas are provided side by side in a second direction different from the first direction.

3. The camera module of claim 1, wherein the first and second light transmissive areas are provided side by side in a first direction, the third and fourth light transmissive areas are provided side by side in the first direction, the first and third light transmissive areas are provided such that a center of the first light transmissive area corresponds to a center of the third light transmissive area, and the second and fourth light transmissive areas are provided such that a center of the second light transmissive area corresponds to a center of the fourth light transmissive area.

4. The camera module of claim 1, wherein the first to fourth light transmissive areas have a circular shape.

* * * * *